United States Patent [19]

Galopin

[11] Patent Number: 4,531,658
[45] Date of Patent: Jul. 30, 1985

[54] MEASURED CHARGE DISPENSER, PARTICULARLY FOR POWDERED MATERIAL

[76] Inventor: Fernand Galopin, 11, boulevard Albert Ier, Monaco, Monaco

[21] Appl. No.: 325,363

[22] Filed: Nov. 27, 1981

[30] Foreign Application Priority Data

Dec. 5, 1980 [MC] Monaco .................................... 1486

[51] Int. Cl.³ ............................................ G01F 11/18
[52] U.S. Cl. ................................... 222/181; 222/185; 222/361
[58] Field of Search ............... 222/361, 362, 181, 185, 222/83, 83.5, 89

[56] References Cited

U.S. PATENT DOCUMENTS

| | | | |
|---|---|---|---|
| 1,758,999 | 5/1930 | Carns .................................. | 222/361 |
| 2,983,408 | 5/1961 | Schwartz ........................ | 222/361 X |
| 3,623,639 | 11/1971 | McShirley ...................... | 222/361 X |
| 4,004,719 | 1/1977 | Weitzman ....................... | 222/361 X |
| 4,150,768 | 4/1979 | Maynard, Jr. .......................... | 222/89 |
| 4,161,265 | 7/1979 | Hauser et al. ....................... | 222/181 |

FOREIGN PATENT DOCUMENTS

| | | | |
|---|---|---|---|
| 1922493 | 2/1971 | Fed. Rep. of Germany ...... | 222/361 |
| 313 | of 1901 | United Kingdom ................ | 222/361 |

*Primary Examiner*—Charles A. Marmor
*Attorney, Agent, or Firm*—Young & Thompson

[57] ABSTRACT

A measured charge dispenser for particulate material comprises a rectangular open-topped base having a drawer between its bottom wall and a superposed horizontal wall. The horizontal wall has a part circular opening therethrough bounded by an upstanding cylindrical flange, and the drawer has at least one upwardly and downwardly opening compartment which in the closed position of the drawer registers with that opening to receive material from an inverted container whose neck is held about the cylindrical flange by a resilient finger. When the drawer is pulled open, the material in the drawer compartment is dispensed by gravity. The portion of the horizontal wall within the cylindrical flange can have a forwardly downwardly inclined surface, e.g. forwardly and upwardly convex, to prevent arching over of the material above the discharge opening. The dispenser can have lugs for slidable reception on a mounting bracket.

11 Claims, 9 Drawing Figures

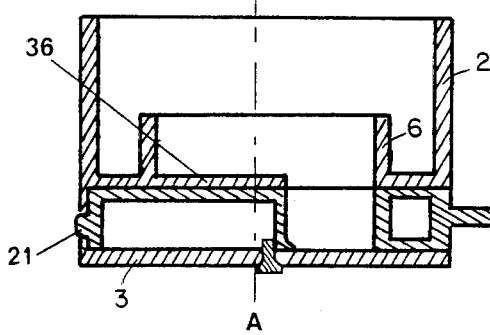
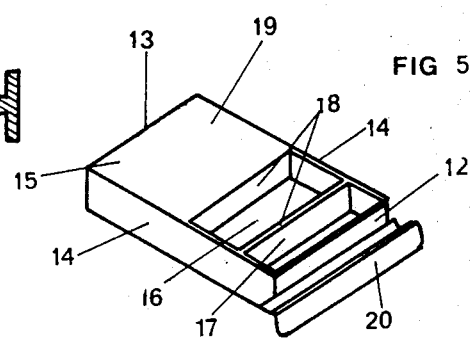
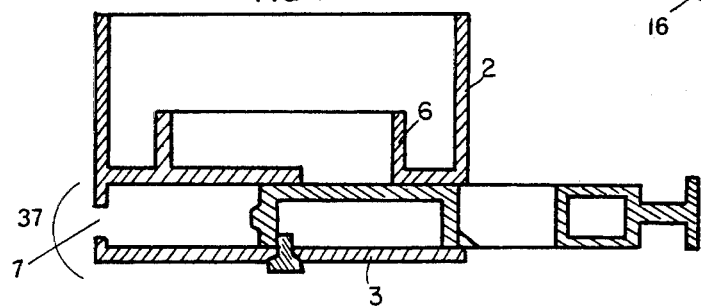
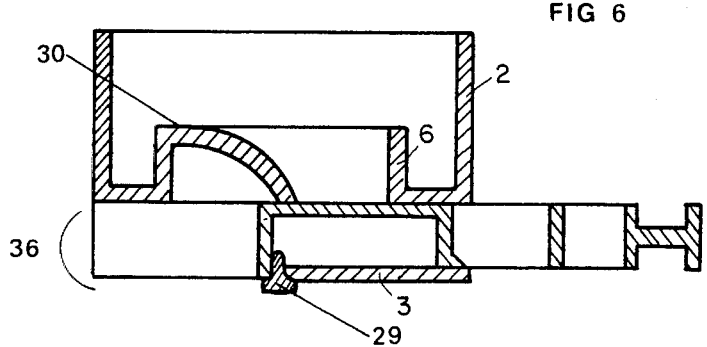
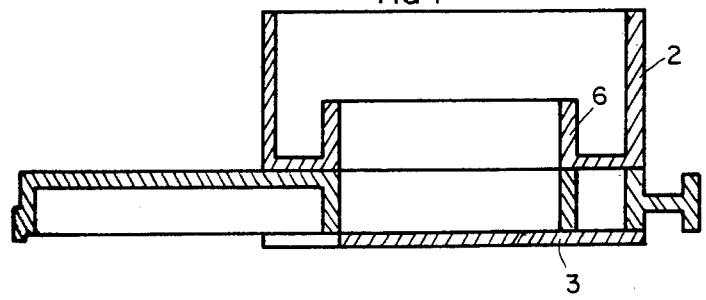

MEASURED CHARGE DISPENSER, PARTICULARLY FOR POWDERED MATERIAL

The present invention relates to a measured charge dispenser, particularly for powdered material, of the type for dispensing soap powder and the automatic dispensing of beverages.

Automatic dispensers for beverages are already known. They provide a cup of the beverage for one or more coins. This is often done by mixing a measured quantity of dry powder in hot or cold water. All these operations are automatic and the apparatus is provided with a device for the dispensing of a predetermined quantity of this powder.

The dispensers of known type do not deliver precisely the predetermined quantity of powder. Thus, the resulting beverage is either too strong or too weak, and the consumer is dissatisfied.

Most often, the powder falls by gravity into a measuring drawer, placed above the outlet opening of the dispensing receptacle; and in practice, the powder can arch over this opening thus spoiling the dispensing operation. This effect is particularly noticeable when the powder is slightly damp.

Most measured charge dispensers of known type cannot be used in all types of dispensing apparatus. These devices provide a wide choice of beverages and are often disposed side-by-side in a series of identical devices so as to permit simultaneous use by a number of customers. The serviceman for these machines must therefore refill a large number of devices. It is necessary that he be able to do this quickly and cleanly; specifically, he must fill the measured charge dispensers without spilling the dry powder.

The present invention has for its object the provision of a measured charge dispenser for powdered material:

which delivers a precisely predetermined quantity of the powder;

which can be used in a wide variety of dispensing apparatus;

which may be filled quickly without loss of powder; and which avoids arching over of the powder in use.

A measured charge dispenser according to the invention comprises at least one drawer or cell which may have two positions:

a "closed" position in which the drawer is disposed below a dispensing receptacle and in which at least one compartment of the drawer communicates with the receptacle by an opening, this compartment being full of the product;

an "open" position, in which the compartment of the drawer discharges the product that it contains and in which no other compartment of the drawer is in communication with the dispensing receptacle.

According to another characteristic of the invention, the drawer slides in a plane perpendicular to the axis of symmetry of the dispensing receptacle.

According to still another characteristic of the invention, the receptacle has, above its opening by which it communicates with the drawer, an inclined and more particularly a convex ramp which avoids arching in the powder.

According to a still further characteristic of the invention, the drawer or cell is either pushed or pulled, automatically or manually, by any known means.

According to a further characteristic of the invention, the dispensing receptacle is constituted by a guideway in which is contained packaging of known type for containing the product and by a base which coacts with this guideway and communicates with the drawer.

Other objects, features and advantages of the present invention will become apparent from a consideration of the following description, taken in connection with the accompanying drawings, in which:

FIG. 3 is a cross-sectional view of FIG. 2, the drawer being in the "closed" position;

FIG. 4 is a view similar to that of FIG. 3, the drawer being in the "open" position;

FIG. 5 is a perspective view of the drawer of the invention;

FIG. 6 is a view similar to FIG. 4, but of a modified form of the invention;

FIG. 7 is a view similar to FIG. 3, but showing another modified form of the invention;

Figure 1:
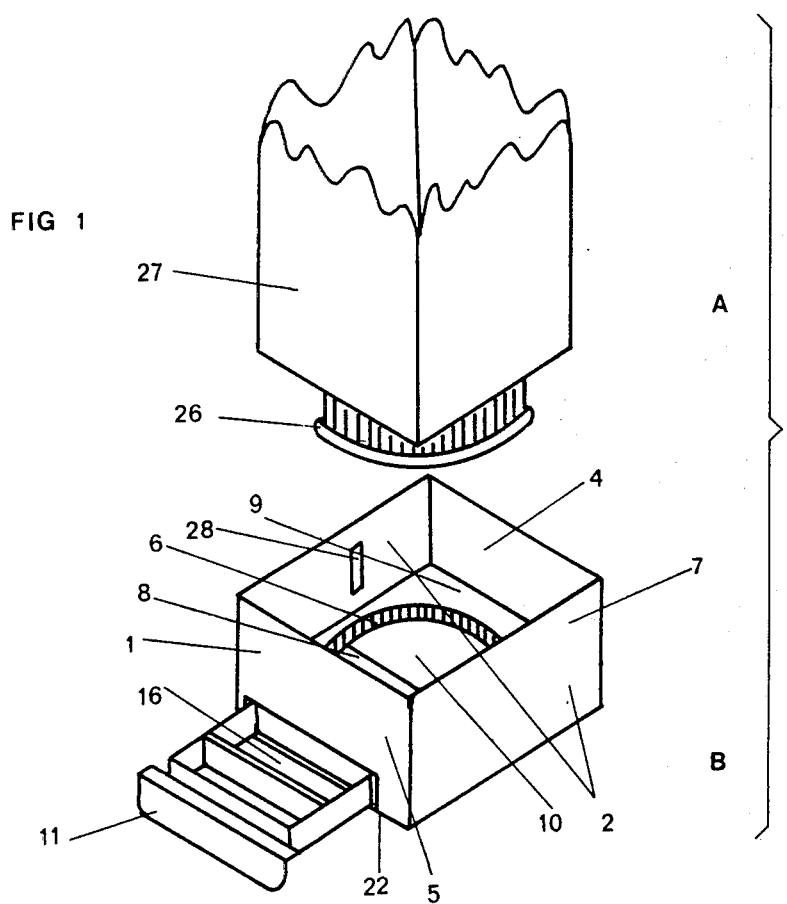
FIG. 1 is an exploded perspective view of a measured charge dispenser according to the invention.

Referring now to the drawings in greater detail, and first to FIG. 1 thereof, there is shown a measured charge dispenser of the present invention, particularly for powdered material, comprising a base 1 having four rectangular side walls 2 and a bottom wall 3. Base 1 is divided into a lower compartment 8 and an upper compartment 9 by a horizontal internal wall 10 parallel to and spaced above the bottom wall 3. Wall 10 has a circular upstanding flange 6 thereon and a part-circular opening therethrough. Upstanding flange 6 is adapted to be surrounded by the circular neck of a container of the powdered material to be dispensed.

A drawer 11 slides in lower compartment 8 between walls 3 and 10. To permit this sliding movement, the lower edge of front wall 5 is cut away. The rear wall 4 of base 1 is pierced by a circular opening 7 at the level of compartment 8 permitting the positioning and sliding of an automatic pusher installed behind rear wall 4 of base 1, in the case of automatic apparatus. This automatic pusher (not shown) serves to open the drawer 11 by pressing on a finger 21 which projects into and closes the opening 7 when the drawer 11 is in the closed position.

Drawer 11 comprises a front wall 12, a rear wall 13 and two side walls 14. It is divided into compartments 15, 16, 17 by transverse partitions 18. The compartments 16 and 17 occupy the forward portion of drawer 11; while the compartment 15 occupies the rear portion. This compartment 15 is closed by an upper wall 19. A grasping rib 20 is fixed along front wall 12 of drawer 11. Rear wall 13 of drawer 11 has the above-mentioned finger 21 which projects rearwardly. Drawer 11 slides in compartment 8 guided by two guides 22, its compartment 15 being disposed in the rear portion of recess 8.

Figure 2:
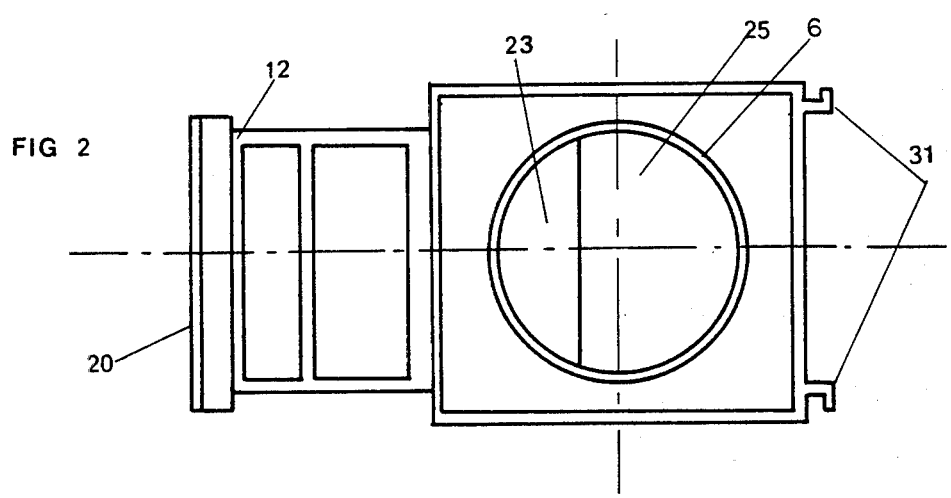
FIG. 2 is a top plan view thereof.
Figure 9:
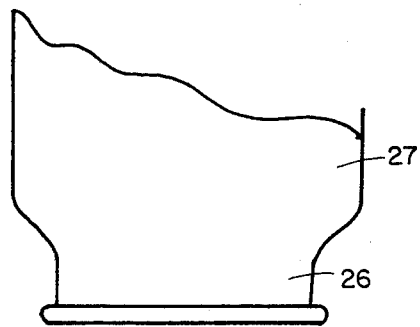
FIG. 9 is a fragmentary side elevational view of a modified form of supply container.

Drawer 11 has two end positions:

a "closed" position, in which the drawer is fully seated in compartment 8; and an "open" position, in which the compartments 16 and 17 are outside compartment 8 (FIG. 2).

Inner wall 10 has a central opening 23 through which the compartments 8 and 9 communicate; but when drawer 11 is in the closed position, compartment 9 communicates with compartment 16 of drawer 11. On its side opposite compartment 8, wall 10 has an upstanding cylindrical flange 24 which surrounds opening 23, opening 23 being somewhat less than half a circle. A wall 25, which can be flat or convex, and is bounded by the flange 6, is disposed above and to the side of opening 23.

The operation of the device is as follows:

The powdered material to be dispensed is contained in a package of known type, which can be inverted on the cylindrical flange 6 projecting into the compartment 9. Cylindrical shoulder 26 of the package-receiving dispenser 27 matches and fits about the outer contour of flange 6. Flexible tongues 28 fixed to side wall 2 of base wall 1 resiliently urge cylindrical shoulder 26 against flange 6.

To dispense a measured quantity of the material, drawer 11 is slid out of its compartment 8. It may be manually operated by pulling on the grasping rib 20 or it may be pressed by the finger 21 with apparatus disposed behind the dispenser.

When the drawer is in closed position, the powder from the superposed package falls by gravity into the chamber 16 of the drawer through opening 23. The presence of a convex wall 25 avoids the risk of arching of the powder in use. Compartment 16 being thus filled, no more product will move downwardly by gravity until the drawer is opened.

When drawer 11 is opened and compartment 16 is no longer in communication with opening 23, the latter is closed by wall 19 of compartment 15. Thus no more movement of the product downwardly is possible. Upon opening the drawer, the compartment 16 empties by gravity. At the end of the opening movement of the drawer, recess 16 is disposed entirely outside the device and the emptying is accordingly complete. This end position is determined by the abutment of a finger 29 against the lower edge of rear wall 13 of drawer 11. Resilient means (not shown) can draw the drawer 11 back into compartment 8, thereby to return it to the "closed" position.

As soon as wall 19 no longer closes the opening 23, the chamber 16 will be refilled. Chamber 17 has no active role, and the wall 18 which separates it from compartment 16 limits the volume of the latter as a function of the measured charge to be dispensed of the powdered material and in a manner such that no corner of chamber 16 will be too far from the filling opening 23.

With a dispenser of this type, there is no fall of the product until the drawer is opened. The quantity of the delivered product is therefore precisely predeterminable because it corresponds exactly to the volume of chamber 16. The beverages obtained with apparatus provided with this device will always be well mixed.

Another advantage of this device is that it is adaptable to any type of dispensing apparatus, the drawer being adapted to be pulled open, particularly by rib 20, or pushed by any of a number of pushing devices extending through the opening 7 provided in the rear wall 4 of base 1.

Any pulverulent material can be dispensed, and particularly as indicated above, a dry powder for the preparation of beverages, but also granulated products such as powdered coffee, soap or the like. Such products can be contained in any desired receptacle adapted to fit within the cylindrical flange 6.

The present invention can be modified as to the cylindrical flange 6 or the base 1. FIGS. 6 and 7 show two other embodiments of measured charge dispenser according to the invention.

FIG. 6 shows in cross section the base 1 according to a first variant of the invention, in which the rear wall and the bottom wall to the rear of the compartment 8 are omitted. The resulting compartment 8 therefore opens forwardly and also rearwardly.

A convex wall 30 may not be needed, particularly if the dispensed products are in the form of grains. There is shown in FIG. 7 a base 1 without such a convex wall. Opening 23 circumscribed by cylindrical flange 6 may thus be limited by a flat wall such as flat wall 25 of FIG. 2.

Figure 8:
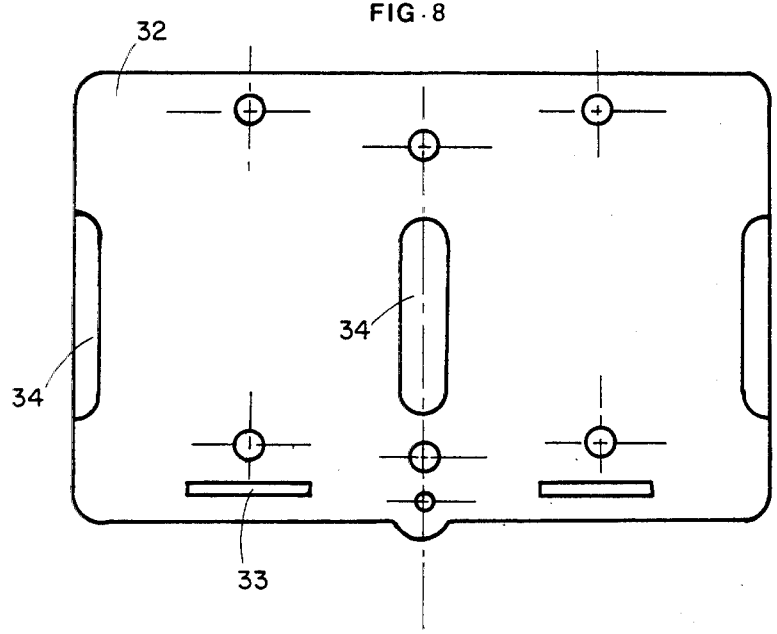
FIG. 8 is an elevational view of a mounting bracket for a dispenser according to the present invention.

Referring again to FIG. 2, it will be seen that there are on the rear face of base 1 two lugs 31 which render the device selectively attachable and detachable. These lugs 31 permit hooking the assembly of the supply receptacle and measured charge dispenser on any distribution apparatus for beverages, by means of a mounting plate 32 (FIG. 8) secured to an appropriate support by screws or adhesive strips or the like. This plate 32 has a plurality of lateral slideways 34 in which the lugs 32 can be inserted from above, as well as abutment stops 33 to limit downward movement of the dispenser on the bracket thus provided and to position the dispenser in its operative orientation.

From a consideration of the foregoing disclosure, therefore, it will be evident that the initially recited objects of the present invention have been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

1. A measured charge dispenser for particulate material, comprising a base adapted to support a receptacle that contains the material, and a drawer slidable horizontally beneath the receptacle between an open and a closed position, the base having an opening through which the receptacle communicates with the drawer, the drawer having at least one upwardly and downwardly opening chamber therein to receive material through said opening in the closed position of the drawer, said chamber being disposed outside the base when the drawer is in the open position to discharge material from the drawer by gravity, the base having a bottom wall that is disposed beneath and closes the compartment when the drawer is in the closed position, the base having a horizontal wall disposed above said bottom wall, the drawer sliding between said walls, said opening being formed in said horizontal wall, an upstanding cylindrical flange on said horizontal wall surrounding said opening, said base having side walls upstanding from said horizontal wall and spaced outwardly from said cylindrical flange, the receptacle having a neck surrounding said cylindrical flange and a resilient finger carried by a said side wall of the base and overlying the cylindrical flange and pressing said neck of said receptacle against the cylindrical flange.

2. A dispenser according to claim 1, in which the drawer slides horizontally.

3. A dispenser as claimed in claim 1, the drawer comprising a plurality of transverse partitions dividing the drawer into three compartments the middle of which is open top and bottom and the rear of which is closed at its top, the middle compartment receiving the material when the drawer is closed and dispensing the material when the drawer is open, and the closure of the rear compartment closing said opening when the drawer is open.

4. A dispenser as claimed in claim 1, in which said opening has the form of part of a circle with its circular edge delimited by said cylindrical flange.

5. A dispenser as claimed in claim 4, said partcircular opening being bounded by a straight edge at its rear, said straight edge being perpendicular to the direction of sliding movement of the drawer.

6. A dispenser as claimed in claim 5, the upper surface of said horizontal wall within said cylindrical flange being forwardly downwardly inclined.

7. A dispenser as claimed in claim 6, said upper surface being forwardly and upwardly convex.

8. A dispenser as claimed in claim 1, and a drawer pull on the forward edge of the drawer.

9. A dispenser as claimed in claim 1, in which said base has a rear wall having an opening therethrough, the drawer having a rear wall that is larger than the last-named opening, and a finger on said rear wall of the drawer that projects through the last-named opening in the closed position of the drawer.

10. A dispenser as claimed in claim 1, the drawer having a downwardly opening compartment at its rear that has an upper horizontal wall that closes said opening in the open position of the drawer, said base having an upwardly extending projection that contacts the forward side of said downwardly opening compartment to determine the closed position of the drawer and that contacts the rear side of said downwardly opening compartment to determine the open position of the drawer.

11. A dispenser as claimed in claim 1, having a rear wall and having positioning lugs on said rear wall adapted to slide vertically in slideways on a mounting bracket for the dispenser.

* * * * *